Dec. 26, 1961    H. H. SARGENT, JR., ET AL    3,014,657
DISCOUNT COMPUTER FOR LIQUID DISPENSING MECHANISM
Filed April 27, 1956    5 Sheets-Sheet 3

INVENTORS
HOWARD H. SARGENT, JR.
BY JOHN H. BICKFORD
HARVEY N. BLISS

Lindsey and Prutzman
ATTORNEYS

Dec. 26, 1961     H. H. SARGENT, JR., ET AL     3,014,657
DISCOUNT COMPUTER FOR LIQUID DISPENSING MECHANISM
Filed April 27, 1956     5 Sheets-Sheet 4

INVENTORS
HOWARD H. SARGENT, JR.
JOHN H. BICKFORD
HARVEY N. BLISS
BY Lindsey and Prutzman
ATTORNEYS Dec. 26, 1961 H. H. SARGENT, JR., ET AL 3,014,657
DISCOUNT COMPUTER FOR LIQUID DISPENSING MECHANISM
Filed April 27, 1956 5 Sheets-Sheet 5

INVENTORS
HOWARD H. SARGENT, JR.
JOHN H. BICKFORD
BY HARVEY N. BLISS

Lindsey and Pritzman
ATTORNEYS

United States Patent Office 3,014,657
Patented Dec. 26, 1961

3,014,657
DISCOUNT COMPUTER FOR LIQUID DISPENSING MECHANISM
Howard H. Sargent, Jr., Portland, John H. Bickford, Middletown, and Harvey N. Bliss, Windsor, Conn., assignors to Veeder-Root Incorporated, Hartford, Conn., a corporation of Connecticut
Filed Apr. 27, 1956, Ser. No. 581,132
27 Claims. (Cl. 235—94)

The present invention relates to liquid dispensing apparatus and, more particularly, to a novel computing mechanism for use in liquid dispensing apparatus which includes means for computing and registering the cost of the liquid dispensed at a predetermined or preselected discount rate.

Computing mechanisms as presently used in liquid dispensing apparatus such as gasoline dispensing pumps provide only for registration of the quantity of liquid dispensed and the total cost of the same at a preselected or established constant price per gallon or other unit of measure. Such an arrangement does not take into account that except for the cost of the liquid dispensed, it is relatively little more expensive to dispense a larger quantity than a smaller quantity and thus if a customer will purchase a larger quantity at one time there is effected a saving in average unit cost which could be passed on at least in part from the seller to the customer to the mutual advantage of both. It also does not take into account that there are frequently different classes of customers such as commercial versus private vehicle operators or cash versus credit customers which could warrant the establishment of a price differential therebetween.

The aim of the present invention is to provide a computing mechanism for liquid dispensing apparatus such as gasoline dispensing pumps which may be used to register the total cost of the liquid dispensed at a discount rate which can be preselected by the operator and which is applied either throughout the entire delivery or a portion thereof.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 7 is a schematic view of the speed change mechanism for driving the cost shaft.

Figure 1:
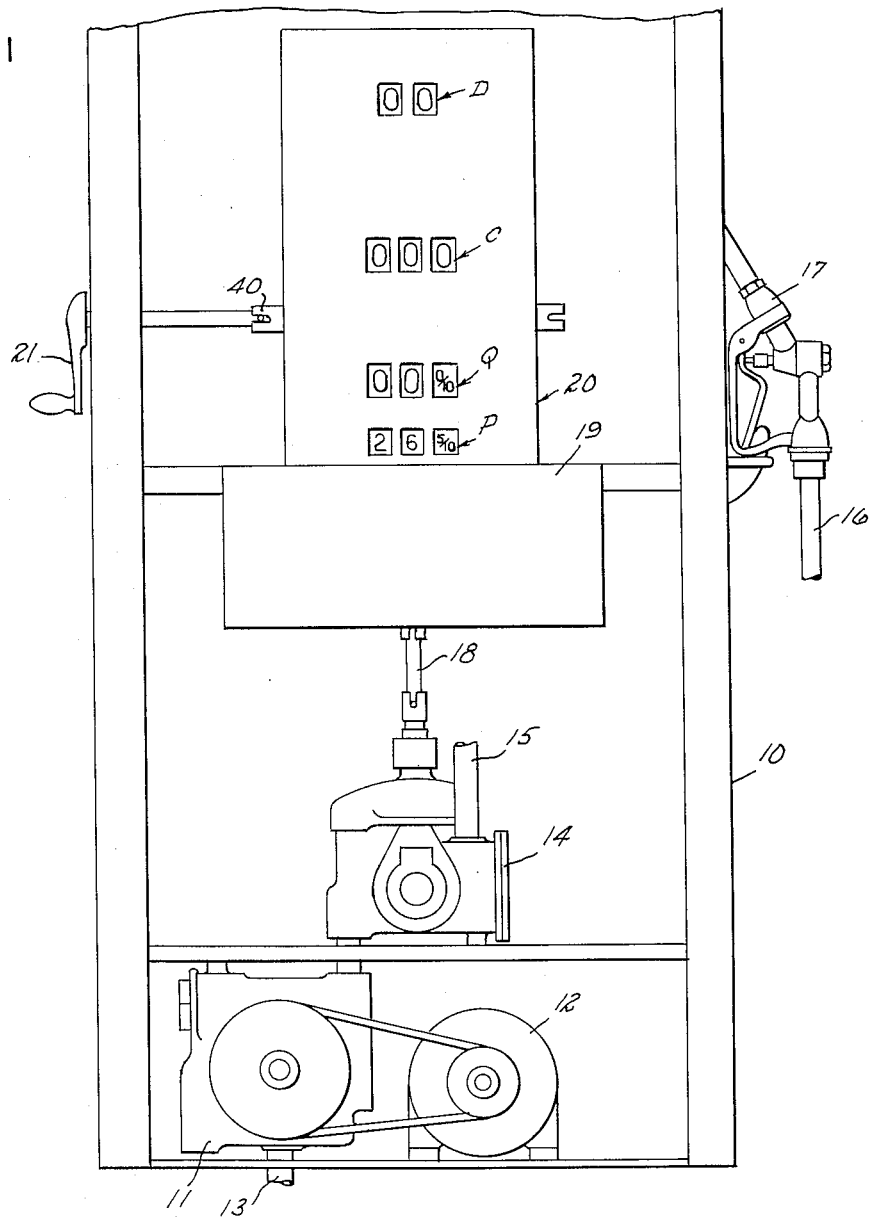
FIG. 1 is a fragmentary front view of a gasoline delivery pump in which a computer of the present invention has been installed, the front wall of the housing being removed to show the internal mechanism.

Referring to the drawings there is shown in FIG. 1 a liquid dispensing apparatus of the type commonly used for dispensing gasoline. Disposed in the housing 10 is a pump 11 driven by a motor 12 for pumping gasoline from the supply line 13 through a meter 14 to an outlet pipe 15, which in turn is connected to a hose 16 having at its outer end the usual dispensing nozzle 17. The meter drive shaft 18 is connected to an adjustable speed change mechanism or variator 19 such as the type disclosed in the Slye Patent No. 2,111,996 dated March 22, 1938. Disposed above the variator 19 is a computer 20 of a type embodying the present invention.

The computer 20 displays a lower set of number wheels P hereinafter referred to as the price wheels and which indicate the base or established price per gallon of the gasoline being dispensed. The price wheels P are connected to the setting mechanism of the variator 19 in the usual manner to show the adjustment of the variator 19 in terms of price per gallon. Above the price wheels P are the quantity number wheels Q which are utilized to register the number of gallons of liquid dispensed. Above the quantity wheels Q are the cost number wheels C which are used to register the total cost of the liquid dispensed and which in this specific embodiment register the total cost which equals the number of gallons dispensed times the base or unit cost per gallon minus the predetermined discount. In other words, the cost wheels C register the actual amount to be charged to the customer after deduction of the discount. The upper set of number wheels D is utilized in this specific embodiment to register the amount of the discount which is being given to the customer in the particular transaction being registered. At the end of one transaction and before the initiation of a second transaction the computer 20 can be returned to initial position, i.e., zeroized by turning the reset handle 21.

Figure 2:
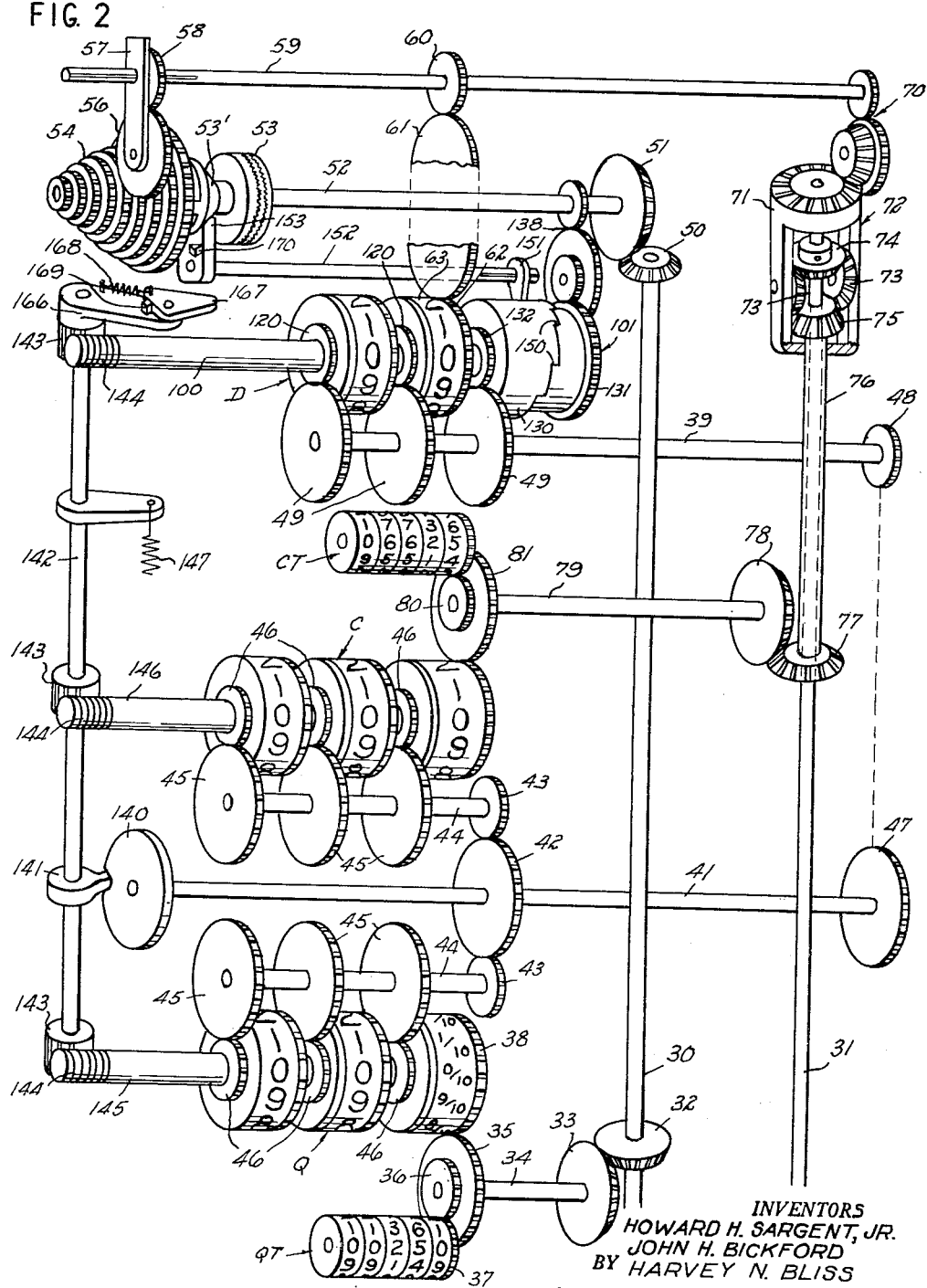
FIG. 2 is a schematic perspective view of one form of registering and computing mechanism constructed in accordance with the invention.
Figure 3:
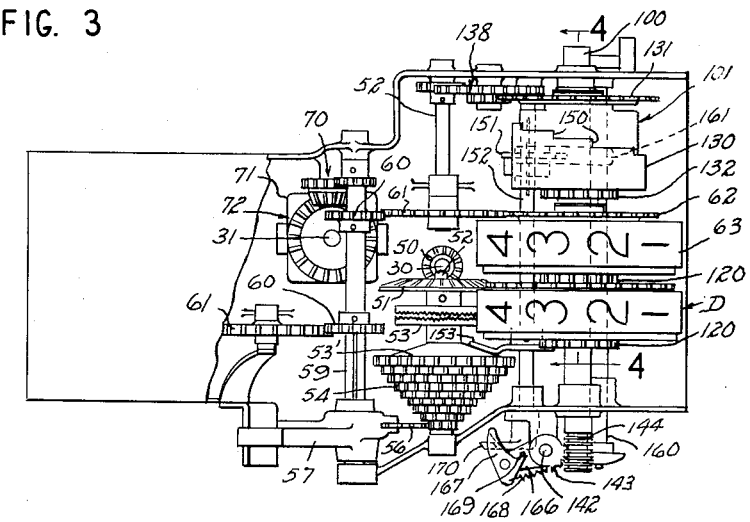
FIG. 3 is a top view of an actual computer embodying the mechanism shown diagrammatically in FIG. 2, the cover plate being partially cut away to show the internal mechanism.
Figure 4:
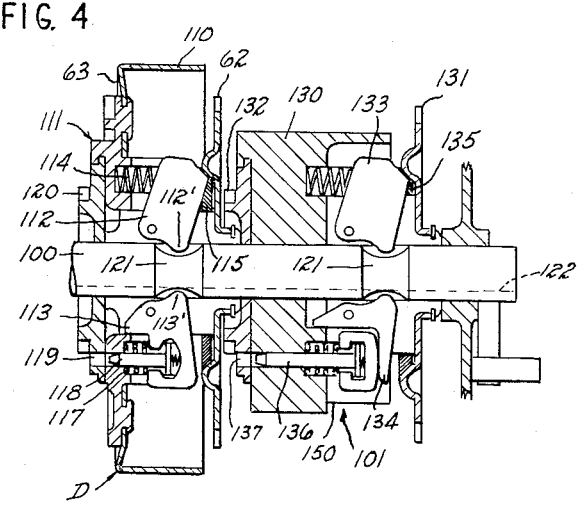
FIG. 4 is a fragmentary cross-sectional view taken along the line 4—4 of FIG. 3.

The internal structure of the computer 20 which is installed in the gasoline pump of FIG. 1 is shown schematically in FIG. 2 of the drawings, and portions thereof are shown more particularly in FIGS. 3 and 4. Referring first to FIG. 2, the shafts 30 and 31 denote the drive shafts which extend from the upper end of the variator 19 for connection to the computer. The shaft 30, although it extends through the variator 19, is in effect driven directly by the meter shaft 18 to which it is connected by coupling 21 and is utilized to turn the number wheels for registering the quantity of liquid dispensed. Shaft 30 will be referred to hereinafter as the quantity drive shaft. The shaft 31 is driven at a different speed by the gearing of the variator 19 and this speed is determined by the setting of the variator 19, which setting depends upon the unit or base price per gallon or other unit of liquid dispensed. As shown in FIG. 7, the variator 19 may comprise a cone of gears 22 connected to shaft 30. A take-off gear 23 which is mounted on the movable carriage 24 may be moved into engagement with any selected one of the gears of the cone of gears 22. The take-off gear 23 meshes with a gear 25 splined to shaft 31 so as to drive the same. Shaft 31 will be referred to hereinafter as the cost drive shaft.

Starting at the bottom of FIG. 2, the first power take-off from the quantity drive shaft 30 is by means of bevel gears 32, 33 to a shaft 34 having drive gears 35, 36. The drive gear 36 meshes with the driven gear 37 of a set of number wheels QT hereinafter referred to as the quantity totalizer wheels, which accumulate the total of quantities dispensed during a period of operation of the pump and are not reset after each transaction. The number wheels QT are concealed within the computer 20, as they are not intended to be viewed by the customer. The drive gear 35 meshes with the driven gear 38 of the first number wheel of the quantity wheels Q. For completeness, it may be mentioned that each set of number wheels of the computer 20 is provided with the usual transfer mechanism so that when the first number wheel is rotated one turn it will advance the next higher wheel by one number, and then when the second wheel has advanced a full turn it will advance the next higher wheel. Since such transfer mechanisms are well known in the art, they have been omitted from the drawings in the interests of simplicity and clarity of presentation.

Returning to the quantity drive shaft 30, it will be noted that at its upper end it is provided with a bevel gear 50 which meshes with bevel gear 51, secured to a shaft 52 which in turn is releasably connected by means of a normally engaged clutch 53 to the gear cone 54. The gear cone 54 is utilized to provide a variable and preselected speed change which is used to set the amount of its discount as will be explained more fully hereinafter. For setting purposes there cooperates with the cone of gears 54 a take-off gear 56 supported on arm 57 and meshing with gear 58, which in turn is splined to the shaft 59. As will be appreciated, the gear 56 can be selectively engaged with any of the individual gears of the cone of gears 54 to provide the desired driving speed within the range of the device. The shaft 59 has at its outer end a gear train 70 which connects the shaft to the cage 71 of a differential 72. The cage 71 supports planetary gears 73 which mesh with a bevel gear 74 fixed to the upper end of the cost drive shaft 31 and a bevel gear 75 which is connected to the upper end of a sleeve 76 having a take-off gear 77 at its lower end. The take-off gear 77 meshes with the bevel gear 78 fixed to shaft 79 and having at its other end the drive gears 80 and 81, which drive respectively the first number wheel of the cost totalizer wheels CT and the first number wheel of the cost wheels C. As will be apparent, the differential 72 is so arranged that the output sleeve 76 which, as just described, will actuate the cost wheel C, is driven at a speed which represents the speed of the cost drive shaft 31 minus the speed of the discount drive shaft 59, so that the cost registered is in terms of the base or unit price less the selected discount.

The shaft 59 has a take-off gear 60 which meshes with idler gear 61, which in turn meshes with the driven gear 62 of the lowest order number wheel 63 of the discount number wheels. The discount number wheels D are supported on an axially movable but non-rotatable supporting shaft 100 and also mounted on this shaft is a predetermining or programming mechanism denoted generally at 101. This portion of the device is shown in more detail in FIGS. 3 and 4 of the drawings.

Referring particularly to FIG. 4 of the drawings, it will be seen that the number wheel 63 comprises a drum 110 bearing indicia on its periphery and fixed to a hub 111. The hub 111 carries two pawls 112 and 113 mounted for swinging movement in a radial plane. The pawl 112 which is biased by spring 114 is constructed to engage with a ring of teeth 115 on the driven gear 62 which except for engagement with the pawl 112 is freely rotatable on the hub 111. The pawl 113, which is biased by spring 117, carries a plunger 118 for engagement in any one of a ring of holes 119 (only one shown) in the resetting gear 120 which is rotatably mounted on the hub 111. The pawls 112 and 113 are provided with shoulders 112' and 113' which normally are received in the circumferential groove 121 of the shaft 100 so that the number wheel is normally engaged with and driven by the driving gear 116 and is disengaged from the resetting gear 120. However, when the shaft 100 is slid axially in a right-hand direction, as viewed in FIG. 4, the pawl 112 is cammed out of engagement with the driving gear 62 to free the number wheel for a resetting operation and at the same time the pawl 113 is cammed to place the plunger 118 into position to engage in a hole 119 of the resetting gear 120. Thus, if the resetting gear 120 is rotated at this time, the resetting gear 120 will pick up the number wheel to turn the same to the reset position. When the number wheel has been zeroized the tail 113' of the pawl 113 will fall into a longitudinal slot 122 in the shaft 100. The slot 122 which extends longitudinally of shaft 100 as shown in FIG. 4 is located so that when the number wheel, in the zero position, the tail of pawl 113 will fall therein and hold the number wheel in zero position and at the same time will permit the pawl to shift sufficiently to disengage the plunger 118 from the resetting gear 120. At the completion of the resetting operation the shaft 100 is shifted to restore it to the original position shown in FIG. 4 which reengages the pawl 112 with the driving gear 62, thus conditioning the number wheel for a registering operation. All of the number wheels in the computer 20, with the exception of the totlaizer wheels QT and CT are of the type just described. This particular construction of the number wheels is disclosed and claimed in the co-pending Bliss application Ser. No. 398,045 filed December 14, 1953, now Patent No. 2,814,444, which also is owned by the assignee of the present application.

The predeterminer or programming mechanism 101 comprises a drum 130 provided with a driving gear 131 and a resetting gear 132, both of which are rotatably mounted on the hub of the drum 130. Internally of the drum 130 is a drive pawl 133 for cooperation with the gear 131 and a reset pawl 134 for cooperation with the resetting gear 132. In the position shown in FIG. 4 the drive pawl 133 is engaged with the teeth 135 of the driving gear 131, but when the shaft 100 is shifted axially in a right-hand direction, as viewed in FIG. 4, the pawl 133 is cammed out of engagement with the driving gear 131 and at the same time pawl 134 is cammed to move the plunger 136 to the left so that it will engage in one of the holes 137 of the reset gear 132. Here again, the return of the drum 130 to initial starting position will automatically disengage the drum from the resetting gear 132 because the pawl 134 will fall into the longitudinal slot 122. Then when the shaft is shifted to the left to restore the mechanism to original starting condition the pawl 133 is reengaged with the drive gear 131, thus conditioning the device for a subsequent dispensing operation. The driven gear 131 of the predeterminer 101 is driven from shaft 52 by the train of gears 138 and thus is rotated by the quantity drive shaft 30.

The periphery of the drum 130 of the predeterminer 101 is relieved as shown to provide a series of shoulders or steps 150 which are spaced both angularly and longitudinally with respect to the predeterminer drum 130. These shoulders or steps 150 are arranged to cooperate with a follower 151 which is splined to a shaft 152 which carries an arm 153 for actuating the clutch 53. In the initial starting position of the apparatus the follower 151 is turned so that it extends into the orbit of one of the shoulders 150, in which position the arm 153 engages the cone 53' of the clutch 53 into cam clutch 53 into disengaged position. The particular shoulder which will engage the follower 151 is selected manually by means of an axially slidable setting rod 160 carrying a yoke 161 which embraces the follower 151. Thus, by moving the setting rod 160 in and out, the follower 151 can be placed in the orbit of any one of the selected shoulders 150. As will be recalled, the predeterminer 130 is turned by the quantity drive shaft 30 and the shoulders 150 are preferably disposed angularly so that when the drum 130 is rotated the follower 151 will be actuated at a selected even number of units such as one gallon, two gallons, three gallons, etc., after the initiation of a dispensing operation. When the preselected shoulder 150 engages the follower 151, the follower is pivoted or cammed so that it rides on the unrelieved portion of the periphery of the drum 130 and this in turn pivots the finger 153 rearwardly to permit the clutch 53 to engage, thus initiating the operation of the discount mechanism.

As previously mentioned all of the number wheels except the totalizer number wheels are reset to zero by turning the reset handle 21. The reset handle 21 is connected by means of coupling 40 to a main reset shaft 41 carrying a gear 42 meshing with gears 43 on auxiliary shafts 44. The auxiliary shafts 44 which extend parallel to the counters C and Q carry gears 45 which mesh with the resetting gears 46 of the individual number wheels. Resetting gears 46 correspond to the resetting gear 120 of the number wheel 63 of discount counter D previously described in detail. Main reset shaft 41 also is connected by gears 47, 48 to auxiliary shaft 39 carrying gears 49 which mesh with the resetting gears 120 of the discount number wheels D and resetting gear 132 of the predeterminer 101. Since the resetting operation requires the axial shifting of the supporting shafts, this is accomplished by means of a notched disc or cam 140 fixed to the end of reset shaft 41 which cooperates with a finger 141 on the transverse shaft 142. The shaft 142 has fixed thereto at suitable elevations the gears 143 which mesh with the rings 144 on the ends of the number wheel supporting shafts 145 and 146 and also the supporting shaft 100 which supports the discount number wheels D and the predeterminer 101. Thus at the initiation of a resetting operation upon initial turning of the main reset shaft 41, the transverse shaft 142 is turned to push in the supporting shafts 101, 145 and 146 and then at the end of the resetting operation, or the completion of one turn of the main reset shaft 41, the finger 141 reengages in the notch of cam 140 permitting the shaft to return to initial starting position under the bias of spring 147, thus conditioning the apparatus for a subsequent dispensing operation.

At the upper end of the transverse shaft 142 there is fixed an arm 166 carrying a pivoted pawl 167 which is biased by the spring 168, but whose pivotal motion is limited by the stop 169. The purpose of the arm 166 and the pawl 167 is to permit the pawl 167 to wipe past the projection 170 which is fixed to the clutch actuating arm 153 during the initial turning of the transverse shaft 142 at the outset of a resetting operation and to cause it to engage the projection 170 so as to return the arm 153 forwardly to the clutch disengaging position shown in FIG. 2 upon return movement of the shaft 142 at the completion of the resetting operation. Since the arm 153 is fixed to the shaft 152, the resetting operation also will pivot the follower 151 into position for engagement by the selected shoulder 150 of the predeterminer 101.

It is believed that the operation of the specific embodiment of the invention which is described will be apparent from the foregoing detailed description, taken with the following explanation. Before the dispensing apparatus is used it is assumed that the operator or owner will first set the variator 19 in the conventional manner so that the drive to the price wheels will reflect the prevailing or fixed price per unit of liquid dispensed. The setting of the variator will be indicated by price wheels P. The operator will then adjust the discount mechanism to provide the desired amount of discount per gallon after a selected minimum number of gallons has been dispensed. The setting of the take-off gear 56 will of course determine the amount per gallon which will be deducted and the setting of the adjusting rod 160 will determine how many galons or other quantity of the liquid will have to be purchased before the discount comes into effect. For a specific example, the operator may desire to set the take-off gear 56 so that the customer will obtain a discount of two cents a gallon and may position the follower 151 so that the discount will apply after the customer has purchased a minimum quantity of five gallons at the base rate. Normally, these settings will be made prior to any transactions and will remain constant for a desired period of time. Before commencing an individual dispensing operation or sale the operator will first turn the resetting handle 21 which, as previously explained, will zeroize the quantity wheels Q, the cost wheels C and the discount wheels D and at the same time this will insure that the clutch 53 is disengaged and that the follower 151 is in position for actuation by the predeterminer 101, which also is reset to initial starting position by the resetting operation. Thereupon the operator may proceed to dispense the liquid and the quantity thereof will be registered on the quantity wheels Q. The cost of the liquid first dispensed will be registered on the cost wheels C at the fixed rate for which the variator has been set, and as indicated on the price wheels P. After the preselected quantity of liquid has been dispensed at the base rate the predeterminer 101 will engage the clutch 53 and thereafter the cost wheels C will accumulate the cost of the liquid dispensed at the selected discount rate and the amount of the discount will be registered on the discount wheels D. Thus, both the seller and the purchaser will have a registration of the total quantity purchased, the total amount to be charged for the same, and an indication of the discount which has been deducted from the cost based on the prevailing base rate. Even though the indicator wheels are reset at the end of each transaction, the operator or owner will have a total of all of the transactions, both as to amount dispensed and the total cost charged by reason of the totalizer counters at CT and QT.

Figure 5:
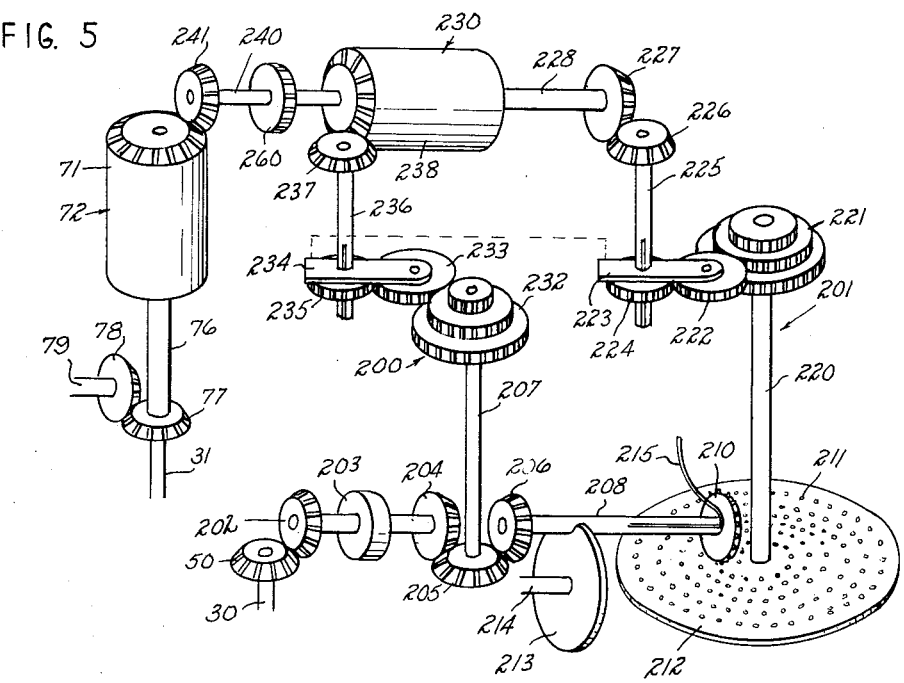
FIG. 5 is a fragmentary schematic view in perspective of a modified version of the mechanism shown in FIG. 2.

Turning now to FIG. 5 of the drawings, there is here shown a modification of the discount mechanism so as to provide a progressively increasing discount during a dispensing operation, as distinct from a single stepwise and constant discount, as shown in FIG. 2. For simplicity of presentation, the portions of the computer which are merely a duplicate of those shown in FIG. 2 have been omitted from FIG. 5. As in the case of the embodiment shown in FIG. 2, the price drive shaft 31 extends through a sleeve 76 to the differential 72 and the output of the differential 72 which is applied to the sleeve 76 is taken off by means of gears 77 and 78 and shaft 79 to drive the cost totalizer number wheel CT and the cost number wheels C. The quantity drive shaft 30 will also have a take-off (not shown) to drive the quantity register Q.

In the embodiment shown in FIG. 5 the take-off gear 50 at the upper end of shaft 30 is utilized to drive a compensator indicated generally at 200, and a variable discount drive indicated generally at 201. The take-off gear 50 meshes with a bevel gear 202 which is connected by clutch 203 to bevel gear 204 which through gears 205 and 206 imparts rotation to the shafts 207 and 208. The outer end of the shaft 208 carries a sprocket 210 which is splined thereon, so that it can move axially but is rotatably fixed to the shaft 208. The sprocket 210 engages the spirally arranged perforations 211 of the disc 212. At the initiation of a dispensing operation the sprocket 210 is engaged in the holes 211 at the center of the disc 212, so that as the shaft 208 is driven the sprocket will travel outwardly in the spiral of holes 211 and thus drive the disc 212 at a progressively decreasing speed. In order to reset this portion of the mechanism the shaft 208 is merely lifted by the notched disc or cam 213 which is connected by shaft 214 to the main reset shaft 45. As soon as the shaft 208 is lifted the sprocket 210 is returned to the initial position by the spring 215. The disc 212 is fixed to a shaft 220 having at its upper end the step gearing or cone of gears 221 for cooperation with an adjustable take-off gear 222 carried by arm 223 and meshing with a gear 224 which is splined on the shaft 225. It thus will be apparent that by selective setting of the take-off gear 222 the output speed of shaft 225 as a result of the turning of disc 212 may be proportionately increased or decreased as desired. The shaft 225 is connected by gears 226 and 227 to the input shaft 228 of a differential 230.

The shaft 207 carries the step gearing or cone of gears 232 at its upper end for cooperation with a take-off gear 233 carried by the arm 234 and meshing with a gear 235, which is splined to a shaft 236. The shaft 236 is connected by bevel gear 237 to the cage 238 of the differential 230. The step gearing 232 and adjustable take-off gear 233 make up the compensator 200 previously referred to. It will be noted that, as indicated by the dotted connecting line, arms 234 and 223 carrying the take-off gears 233 and 222 respectively, are interconnected so that they are adjusted simultaneously. The purpose of the compensator 200 is to insure that the output of the differential 230 will always be zero at the initiation of a dispensing operation. In the use of the embodiment shown in FIG. 5 it is contemplated that the clutch 203 will remain engaged at all times although it is within the scope of the invention to delay the operation of the discount mechanism for a selected period of operation, if desired, by actuating the clutch 203 manually or by means of a predeterminer mechanism such as the predeterminer mechanism 101 of FIG. 2.

In the differential 230 the output of the variable discount drive 201 is subtracted from the output of the compensator 200. Thus if the output of the compensator 200 is always equal to the output of the variable discount drive 201 at the initiation of a dispensing operation there will be no turning movement applied initially to the output shaft 240. However, as dispensing continues and sprocket 210 moves outwardly on disc 212, the output of variable discount drive 201 will become progressively less than that of compensator 200 resulting in movement being applied to the differential output shaft 240 which increases progressively from zero. A ceiling is placed on the maximum turning speed of output shaft 240 because the sprocket 210 cannot move outwardly on the disc 212 beyond the outer row of holes 211 so that the amount of the discount cannot become excessive, which otherwise might be the case in the event a very large quantity of liquid were dispensed in a single transaction. The output shaft 240 of differential 230 is connected by bevel gear 241 to the cage 71 of the differential 72 so that the amount of turning of shaft 240 is deducted from the input from cost drive shaft 31. Thus the final drive to the cost wheels C is based on the fixed price per gallon of the liquid less a discount which gradually increases from zero (within limits) as dispensing continues. As in the embodiment of FIG. 2, the amount of the discount may be indicated by discount wheels D which may be conveniently driven from gear 260 which corresponds to the gear 60 of FIG. 2.

Figure 6:
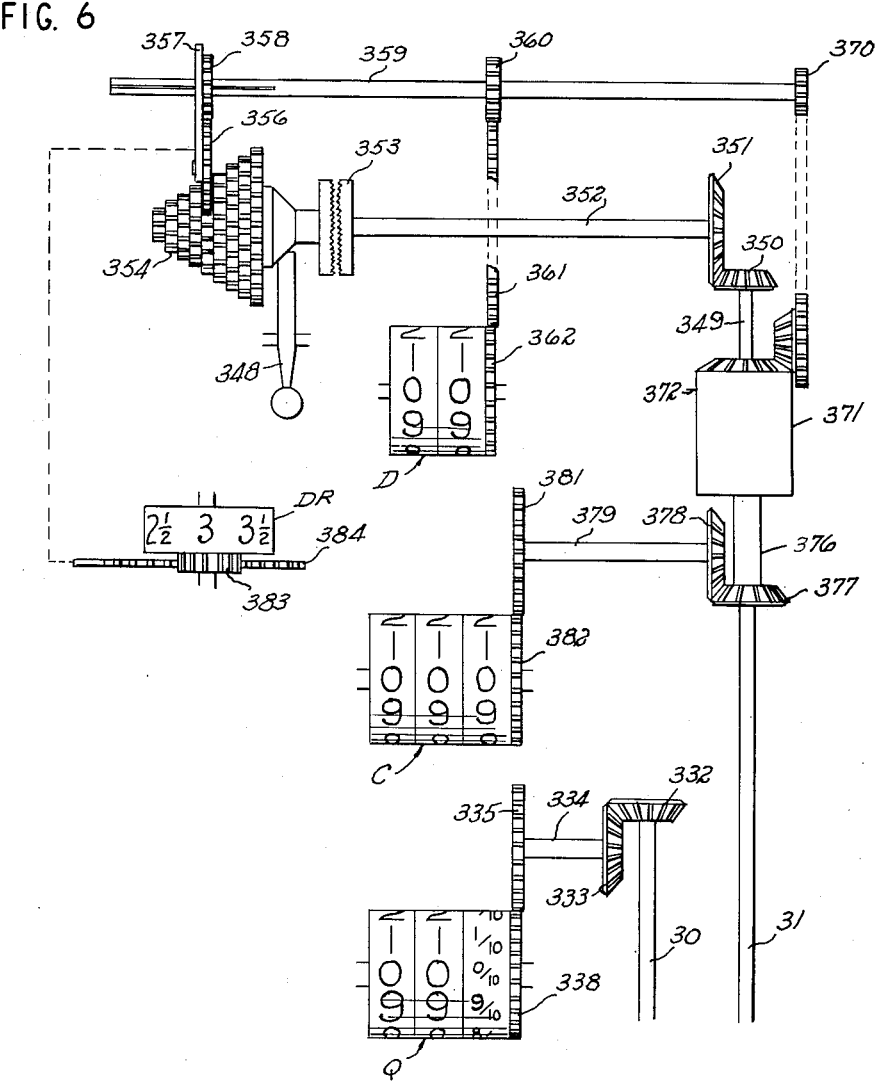
FIG. 6 is a schematic view of a further modified version of the mechanism shown in FIG. 2.

Turning now to the modified embodiment shown in FIG. 6 of the drawings, this represents a simplification of the embodiment shown in FIG. 2 and also shows an arrangement whereby the discount mechanism is actuated from the price drive shaft 31 rather than the quantity drive shaft 30, so that the discount is preselected as a proportion or percentage of the price, regardless of the price setting of the variator 19 instead of a preselected amount per unit of liquid dispensed. In this embodiment the quantity shaft 30 has a take-off gear 332 meshing with bevel gear 333 which is connected by shaft 334 to gear 335 which meshes with the driven gear 338 of the first number wheel of quantity number wheels Q. For simplicity of presentation the resetting mechanism for the number wheels and the totalizer counters CT and QT have been omitted from FIG. 6, since all of these mechanisms are fully illustrated in FIG. 2 of the drawings.

The price drive shaft 31 is connected to the differential 372 which has an output sleeve 376 carrying a take-off gear 377 meshing with gear 378 on shaft 379 for operating the gear 381 meshing with the driven gear 382 of the lowest order number wheel of the cost number wheels C. An extension of shaft 31 going through the differential and indicated at 349 carries a bevel gear 350 meshing with gear 351 carried by shaft 352. A manually operated clutch 353 is utilized to connect the shaft 352 with the cone of gears 354. A handle 348 is utilized to operate the clutch 353 under the control of the operator. The take-off gear 356 mounted on arm 357 and meshing with gear 358 splined to shaft 359 permits the operator to select the amount of the discount, as in the case of the embodiment shown in FIG. 2. The shaft 359 through take-off gear 360, and idler gear 361, drives the driven gear 362 of the first number wheel of the discount number wheels D. The gear drive indicated at 370 is utilized to connect the shaft 359 to the cage 371 of the differential 372, so that as in the embodiment shown in FIG. 2, the amount of the discount is deducted from the price of the price drive shaft 31.

In this embodiment the operator may initiate the operation of the discount mechanism at any time, merely by actuating the handle 348. A similar manually operated clutch could be substituted for the automatically operated clutch of the embodiment shown in FIG. 2, or could be utilized in the embodiment shown in FIG. 5. It also will be appreciated that the operation of the discount mechanism from the price drive shaft 31 could also be utilized in the embodiment shown in FIGS. 2 and 5, depending upon whether it is desired to have a discount in terms of a preselected percentage of the price or whether it is desired to have the discount in terms of a fixed amount per unit of liquid dispensed.

In all the embodiments shown, it is contemplated that the amount of the discount for which the computer has been set may be visibly indicated to the customer if desired. An arrangement for doing this is illustrated in the embodiment shown in FIG. 6. Referring to FIG. 6, the supporting arm 357 for take-off gear 356 is connected as shown by the dotted line to a rack 384 so that they move concurrently. The rack 384 meshes with a pinion 383 which is carried by a discount rate indicating number wheel DR. Thus as the take-off gear 356 is selectively positioned relative to the cone of gears 354, its position and hence the discount rate is indicated by the number wheel DR. Other forms of indicators may be utilized in place of number wheels, as desired, within the scope of the invention.

It thus will be seen that there has been provided in accordance with the invention various specific embodiments of a discount computer for liquid dispensing mechanism wherein a constant or a variable discount may be provided commencing either at the initiation of the dispensing operation or after a selected quantity of liquid has been dispensed. Various combinations of the components can be readily utilized to provide the particular operating characteristics desired.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

The language used in the following claims is intended to cover all of the generic and specific features of the invention herein described and all statements of the scope of the invention which, as a matter of language, might be said to fall therebetween.

We claim:

1. In a liquid dispensing apparatus, a liquid flow line, a meter in said flow line, a first gear train driven by the meter for producing a first movement in proportion to an established price per unit of the liquid dispensed, means for adjusting the output of the first gear train, a second gear train driven by the meter for producing a second movement proportional to a discount from the established price, indicator means for registering the output of said gear trains connected to said gear trains, a disengageable clutch for rendering the second gear train inoperable to drive the indicator means, and means to engage and disengage the clutch.

2. In a liquid dispensing apparatus, a liquid flow line, a meter in said flow line, a first gear train driven by the meter for producing a first movement in proportion to an established price per unit of the liquid dispensed, means for adjusting the output of the first gear train, a second gear train driven by the meter for producing a second movement proportional to a discount from the established price, a clutch for connecting and disconnecting the second gear train, means for engaging the clutch after a selected period of operation of the first gear train, and register means for registering the output of said gear trains.

3. In a liquid dispensing apparatus, a liquid flow line, a meter in said flow line, a first gear train driven by the meter for producing a first movement in proportion to an established price per unit of the liquid dispensed, means for adjusting the output of the first gear train, a second gear train driven by the meter for producing a second movement proportional to a discount from the established price, a clutch for connecting and disconnecting the second gear train, means for engaging the clutch after a selected period of operation of the first gear train including a predeterminer driven by the meter, means for variously setting the predeterminer to initiate engagement of the clutch after varying periods of operation, and register means for registering the output of said gear trains.

4. In a liquid dispensing apparatus, a liquid flow line, a meter in said flow line, a first gear train driven by the meter for producing a first movement in proportion to an established price per unit of the liquid dispensed, means for adjusting the output of the first gear train, a second gear train driven by the meter for producing a second movement proportional to a discount from the established price, a clutch for connecting and disconnecting the second gear train, means for engaging the clutch after a selected period of operation of the first gear train including a predeterminer driven by the meter, means for variously setting the predeterminer to initiate engagement of the clutch after varying periods of operation, register means for registering the output of said gear trains, and means for simultaneously resetting the register means and the predeterminer to initial starting position following a dispensing operation.

5. In a liquid dispensing apparatus, a liquid flow line, a meter in said flow line, a first gear train driven by the meter for producing a first movement in proportion to an established price per unit of the liquid dispensed, means for adjusting the output of the first gear train, a second gear train driven by the meter for producing a second movement proportional to a discount from the established price, a register, and a differential connecting the gear trains to the register.

6. In a liquid dispensing apparatus, a liquid flow line, a meter in the flow line, a quantity register driven by the meter, a cost register, a differential connected to the cost register, a first variable speed drive between the differential and the meter, and a second variable speed drive between the meter and the differential, the output of the second variable speed drive being subtracted from the output of the first variable speed drive by the differential.

7. In a liquid dispensing apparatus, a liquid flow line, a meter in the flow line, a quantity register driven by the meter, a cost register, a differential connected to the cost register, a first variable speed drive between the meter and the differential, the output of the second variable speed drive being subtracted from the output of the first variable speed drive by the differential, and a discount register connected to the second variable speed drive.

8. In a liquid dispensing apparatus, a liquid flow line, a meter in the flow line, a quantity register driven by the meter, a cost register, a differential connected to the cost register, a first variable speed drive between the differential and the meter, a second variable speed drive between the meter and the differential, the output of the second variable speed drive being subtracted from the output of the first variable speed drive by the differential, and a clutch between the meter and the second variable speed drive for rendering the second variable speed drive inoperative.

9. In a liquid dispensing apparatus, a liquid flow line, a meter in the flow line, a quantity register driven by the meter, a cost register, a differential connected to the cost register, a first variable speed drive between the differential and the meter, a second variable speed drive between the meter and the differential, the output of the second variable speed drive being subtracted from the output of the first variable speed drive by the differential, a clutch between the meter and the second variable speed drive, and means actuated by the meter for engaging the clutch after a predetermined period of operation.

10. In a liquid dispensing apparatus, a liquid flow line, a meter in the flow line, a quantity register driven by the meter, a cost register, a differential connected to the cost register, a first variable speed drive between the differential and the meter, a second variable speed drive between the meter and the differential, the output of the second variable speed drive being subtracted from the output of the first variable speed drive by the differential, a clutch between the meter and the second variable speed drive, clutch operating means for engaging the clutch, and presettable means driven by the meter for actuating the clutch operating means after a selected period of operation.

11. A discount computer for liquid dispensing apparatus comprising a cost register, a differential connected to the cost register, a first variable speed drive connected to the differential and adapted to be driven by a meter for producing a turning movement in proportion to a selected fixed price per unit of liquid dispensed, and a second variable speed drive connected to the differential and adapted to be driven by the meter for producing a turning movement in proportion to a discount from the selected fixed price, the input from the second variable speed drive being subtracted from the input of the first variable speed drive in the differential.

12. A discount computer for liquid dispensing apparatus comprising a first variable speed change mechanism adapted to be driven by a meter for producing a turning movement in proportion to a selected fixed price per unit of liquid dispensed, a second variable speed change mechanism adapted to be driven by the meter for producing a turning movement in proportion to a selected discount from the selected fixed price, setting means for the second variable speed change mechanism, means for registering the output of said variable speed change mechanisms, and an indicator connected to said setting means for indicating the setting of the second variable speed change mechanism.

13. A discount computer for liquid dispensing apparatus comprising a register having a quantity indicator and a cost indicator, and means for connecting the register to a meter comprising first driving means connected to the quantity indicator, second driving means connected to the cost indicator including a differential and a first variable speed change mechanism, and a second variable speed change mechanism connected between the differential and the first driving means.

14. A discount computer for liquid dispensing apparatus comprising a register having a quantity indicator and a cost indicator, and means for connecting the register to a meter comprising first driving means connected to the quantity indicator, second driving means connected to the cost indicator including a differential and a first variable speed change mechanism, and a second variable speed change mechanism connected to the differential and driven by the first variable speed change mechanism.

15. A discount computer for liquid dispensing apparatus of the type having a meter, comprising the combination of a register having cost indicating number wheels, a variator adapted to be driven by the meter comprising a first variable speed change mechanism, a discount mechanism adapted to be driven by the meter comprising a second variable speed change mechanism, a differential connecting the variator and the discount mechanism to the cost indicator number wheels, and means for connecting the discount mechanism to the meter including a clutch.

16. A discount computer for liquid dispensing apparatus of the type having a meter, comprising the combination of a register having cost indicating number wheels, means for driving the quantity indicating number wheels from the meter, a variator adapted to be driven by the meter comprising a cone of gears and a take-off gear engageable selectively with one of the cone of gears, a discount mechanism comprising a cone of gears and a take-off gear engageable selectively with one of the last-named cone of gears, a differential connecting the variator and the discount mechanism to the cost indicator number wheels, and means for connecting the discount mechanism to the meter including a clutch.

17. A discount computer for liquid dispensing apparatus of the type having a meter, comprising the combination of a register having quantity indicating number wheels and cost indicating number wheels, means for driving the quantity indicating number wheels from the meter, a variator adapted to be driven by the meter comprising a cone of gears and a take-off gear engageable selectively with one of the cone of gears, a discount mechanism comprising a cone of gears and a take-off gear engageable selectively with one of the last-named cone of gears, a differential connecting the variator and the discount mechanism to the cost indicator number wheels, and means for connecting the discount mechanism to the meter including a clutch lever.

18. A discount computer for liquid dispensing apparatus of the type having a meter, comprising the combination of a register having quantity indicating number wheels and cost indicating number wheels, means for driving the quantity indicating number wheels from the meter, a variator adapted to be driven by the meter comprising a cone of gears and a take-off gear engageable selectively with one of the cone of gears, a discount mechanism comprising a cone of gears and a take-off gear engageable selectively with one of the last-named cone of gears, a differential connecting the variator and the discount mechanism to the cost indicator number wheels, means for connecting the discount mechanism to the meter including a clutch, and a predeterminer adapted to be driven by the meter including means for engaging the clutch following the dispensing of a selected quantity of liquid.

19. A discount computer for liquid dispensing apparatus of the type having a meter, comprising the combination of a register having quantity indicating number wheels, cost indicating number wheels, and discount indicating number wheels, means for driving the quantity indicating number wheels from the meter, a variator adapted to be driven by the meter comprising a cone of gears and a take-off gear engageable selectively with one of the cone of gears, a discount mechanism connected to the discount indicating number wheels comprising a cone of gears and a take-off gear engageable selectively with one of the last-named cone of gears, a differential connecting the variator and the discount mechanism to the cost indicator number wheels, means for connecting the discount mechanism to the meter including a clutch, a predeterminer adapted to be driven by the meter including means for engaging the clutch following the dispensing of a preselected quantity of liquid, and means for resetting the register and the predeterminer to original starting position and disengaging the clutch following a dispensing operation.

20. A discount computer for liquid dispensing apparatus of the type having a meter, comprising the combination of a register having quantity indicating number wheels, cost indicating number wheels, and discount indicating number wheels, means for driving the quantity indicating number wheels from the meter, a variator adapted to be driven by the meter comprising a cone of gears and a take-off gear engageable selectively with one of the cone of gears, a discount mechanism conected to the discount indicating number wheels comprising a cone of gears and a take-off gear engageable selectively with one of the last-named cone of gears, a differential connecting the variator and the discount mechanism to the cost indicator number wheels, means for connecting the discount mechanism to the meter including a clutch having an actuating lever, a predeterminer adapted to be driven by the meter having means for moving the clutch actuating lever to clutch engaging position following the dispensing of a preselected quantity of liquid, and means for resetting the register and the predeterminer to original starting position and disengaging the clutch following a dispensing operation.

21. A discount computer for liquid dispensing apparatus of the type having a meter, comprising the combination of a register having quantity indicating number wheels, cost indicating number wheels, and discount indicating number wheels, means for driving the quantity indicating number wheels from the meter, a variator adapted to be driven by the meter comprising a cone of gears and a take-off gear engageable selectively with one of the cone of gears, a discount mechanism connected to the discount indicating number wheels comprising a cone of gears and a take-off gear engageable selectively with one of the last-named cone of gears, a differential connecting the variator and the discount mechanism to the cost indicating number wheels, means for connecting the discount mechanism to the meter including a clutch having an actuating lever, a predeterminer adapted to be driven by the meter comprising a rotatable member having angularly and longitudinally spaced shoulders and a follower movable selectively into position for engagement by one of said shoulders, said follower being connected to the clutch actuating lever, and means for simultaneously resetting the register and the predeterminer to original starting position and moving the follower and clutch actuating lever to clutch disengaging position following a dispensing operation.

22. A discount computer for liquid dispensing apparatus of the type having a meter, comprising the combination of a register having quantity indicating number wheels and cost indicating number wheels, a drive shaft for connecting the quantity indicating number wheels to the meter, a variator adapted to be connected to the meter comprising a variable speed change mechanism, a discount mechanism adapted to be driven by the meter comprising a disc having a spirally arranged set of holes and a sprocket engaged in said holes, and a differential combining the outputs of said discount mechanism and the variator and connected to the cost indicating number wheels.

23. A discount computer for liquid dispensing apparatus of the type having a meter, comprising the combination of a register having quantity indicating number wheels and indicating number wheels, a drive shaft for connecting the quantity indicating number wheels to the meter, a variator adapted to be connected to the meter comprising a cone of gears and a take-off gear for engagement selectively with one of said cone of gears, a discount mechanism adapted to be driven by the meter comprising a disc having a spirally arranged set of holes and a sprocket engaged in said holes, a first variable speed change mechanism for changing the output of said discount mechanism, a compensator adapted to be driven by the meter comprising a second variable speed change mechanism, a first differential combining the outputs of said compensator and discount mechanism, and a second differential combining the outputs of said first differential and the variator and connected to the cost indicating number wheels.

24. A discount computer for liquid dispensing apparatus of the type having a meter, comprising the combination of a register having quantity indicating number wheels, cost indicating number wheels and discount indicating number wheels, a drive shaft for connecting the quantity indicating number wheels to the meter, a variator adapted to be connected to the meter comprising a cone of gears and a take-off gear for engagement selectively with one of said cone of gears, a discount mechanism adapted to be driven by the meter comprising a disc having a spirally arranged set of holes and a sprocket engaged in said holes, a first variable speed change mechanism for changing the output of said discount mechanism, a compensator adapted to be driven by the meter comprising a second variable speed change mechanism, a first differential combining the outputs of said compensator and discount mechanism and connected to the discount indicating number wheels, a second differential combining the outputs of said first differential and the variator and connected to the cost indicating number wheels, and means for resetting the number wheels and the discount mechanism to original position following a dispensing operation.

25. A discount computer for liquid dispensing apparatus of the type having a meter comprising the combination of a register having quantity indicating number wheels, cost indicating number wheels and discount indicating number wheels, a drive shaft for connecting the quantity indicating number wheels to the meter, a variator adapted to be connected to the meter comprising a cone of gears and a take-off gear for engagement selectively with one of said cone of gears, a discount mechanism adapted to be driven by the meter comprising a disc having a spirally arranged set of holes and a sprocket engaged in said holes, a first variable speed change mechanism for changing the output of said discount mechanism, a compensator adapted to be driven by the meter comprising a second variable speed change mechanism, means for simultaneously setting said first and second variable speed change mechanism, a first differential combining the outputs of said compensator and discount mechanism and connected to the discount indicating number wheels, a second differential combining the outputs of said first differential and the variator and connected to the cost indicating number wheels, and means for simultaneously resetting the number wheels and the discount mechanism to original position following a dispensing operation.

26. A discount computer comprising a cost register, a differential drivingly connected to the cost register, first driving means connected to the differential for driving the cost register in an adding direction, second driving means connected to the differential for driving the cost register in a subtracting direction, operating means to impart movement to the first driving means proportional to the fixed cost to be registered, means connecting the operating means to the second driving means to impart movement to the second driving means proportional to a discount from a fixed cost, and means rendering the last-named means inoperable to drive the cost register until a predetermined cost has been registered.

27. A discount computer comprising a first speed change mechanism for providing an output movement proportional to a fixed cost to be registered, a second speed change mechanism for providing an output movement proportional to a discount from the fixed cost, a cost register, a differential drivingly connected to the cost register, first driving means between the first speed change mechanism and the differential for driving the cost register in an adding direction, second drive means between the second speed change mechanism and the differential for driving the cost register in a subtracting direction, and a common drive means connected to both speed change mechanisms for simultaneous operation of said mechanisms.

References Cited in the file of this patent

UNITED STATES PATENTS

| | | |
|---|---|---|
| 1,084,671 | Tallmadge | Jan. 20, 1914 |
| 1,340,435 | Bryce | May 18, 1920 |
| 2,095,329 | Hazard | Oct. 12, 1937 |
| 2,193,108 | Mettler | Mar. 12, 1940 |
| 2,332,304 | Davies | Oct. 19, 1943 |
| 2,754,057 | Stahl | July 10, 1956 |
| 2,836,361 | Haupt | May 27, 1958 |